United States Patent [19]

Amano et al.

[11] Patent Number: 5,118,741

[45] Date of Patent: Jun. 2, 1992

[54] VINYL CHLORIDE RESIN COMPOSITIONS USED FOR FOOD CONTAINERS AND FOOD PACKING MATERIALS

[75] Inventors: Tadashi Amano, Hazaki; Shigehiro Hoshida, Kamisu, both of Japan

[73] Assignee: Shin-Etsu Chemical Co., Ltd., Japan

[21] Appl. No.: 755,608

[22] Filed: Sep. 5, 1991

Related U.S. Application Data

[63] Continuation of Ser. No. 397,252, Aug. 23, 1989, abandoned.

[30] Foreign Application Priority Data

Sep. 8, 1988 [JP] Japan .................. 63-224970

[51] Int. Cl.⁵ .................................. C08K 5/58
[52] U.S. Cl. .................. 524/178; 524/503; 524/179; 524/400; 524/399
[58] Field of Search ........... 524/179, 503, 178, 400, 524/399

[56] References Cited

U.S. PATENT DOCUMENTS

| | | | |
|---|---|---|---|
| 3,892,692 | 7/1975 | Heiberger | 524/314 |
| 4,132,691 | 1/1979 | Eik | 524/182 |
| 4,528,315 | 7/1985 | Eck et al. | 524/503 |

FOREIGN PATENT DOCUMENTS 53-136089 11/1978 Japan.
61-18562 5/1986 Japan.

Primary Examiner—Joseph L. Schofer
Assistant Examiner—Peter Mulcahy
Attorney, Agent, or Firm—Parkhurst, Wendel & Rossi

[57] ABSTRACT

Such food packing materials as heat shrinkable films or such formed containers for food as bottles are manufatured by forming resin compositions of the following compostions: (a) 100 weight parts of vinyl chloride based resin obtained by adding 0.005 to 0.5 weight parts of partially saponified polyvinyl alcohol, degree of saponification 20-55 mol %, means degree of polymerization 150-600, to 100 weight parts of loaded vinyl chloride monomer or a mixture of vinyl based monomer with vinyl chloride as main, during suspension-polymerizing in an aqueous medium under the existence of 0.03-0.08 weight parts of partially saponified polyvinyl alcohol, degree of saponification 65-80 mol %, means degree of polymerization 600-1000, or else in slurry after completion of the suspension-polymerizing; (b) 0.3 to 5 weight parts of non-toxic stabilizer for food which is a liquid composite stabilizer; and (c) 4 to 15 weigth parts of butadiene-styrene based copolymer resin. The food packing materials are resistant to whitening of their surface caused either by contact with water, alcohol, aqueous water of alcohol or incubation for prolonged time under a high temperature and high humidity atmosphere, thus enabling an improvement in their quality.

6 Claims, No Drawings

VINYL CHLORIDE RESIN COMPOSITIONS USED FOR FOOD CONTAINERS AND FOOD PACKING MATERIALS

This is a continuation of application Ser. No. 07/397,252 filed Aug. 23, 1989, now abandoned.

BACKGROUND OF THE INVENTION

This invention relates to vinylchloride resin compositions used for such food containers as blow-molded bottles and food packing materials including heat-shrinkable labels and heat-shrinkable sealing caps, and more specifically to those compositions that hardly become opaque even when treated with warm water.

Products made from vinyl chloride resins are cheap and excellent in mechanical properties, chemical resistance, weatherability and transparency, which allows for making products of optional hardness from hard to soft one by adding a wide variety of plasticizers, and are thus utilized in a wide field of applications. Since however, these resins are rather poor in thermal stability at the time of forming, it is considered that addition of stabilizers is essential. As these stabilizers, many types have been known such as a wide variety of metal containing compounds.

Non-toxic stabilizers that do not harm transparency have so far been adopted to vinyl chloride based resin compositions which are used for food containers and so forth. Of most frequent use are liquid composite stabilizers such as octyl tin mercaptide compound, octyl tin maleate compound, and calcium-soap/zinc-soap/auxiliaries (mainly epoxidized soybean oil, organic phosphorous acid compound).

It is well known, however that the vinyl chloride resin compositions so far used for bottles, among others, were problematical in that when these bottles were loaded with an aqueous solution of alcohol or carbonated beverage and then exposed to high temperature vapor for sterilization, or when the bottles themselves are kept under high temperature and high humidity atmosphere for a long time, the surface thereof becomes opaque thereby injuring the outer appearance. In the case where conventional vinyl chloride based resin compositions are formed into heat shrinkable labels to be adhered onto the bottles for carbonated beverages, they should be exposed to the sterilizing process as above, which makes them cloudy and harms their beauty.

As the result of our intensified researches and studies to eliminate such disadvantages as above, we eventually achieved this invention.

SUMMARY OF THE INVENTION

The purpose of this invention is to provide such vinylchloride based resin compositions free from the foregoing problematical points. The vinyl chloride resin compositions provided by this invention are transparent and hardly become opaque or cloudy even when they are exposed to high temperature vapor or kept under a high temperature and high humidity atmosphere for a long time, thus being suited for use in such food containers as blow-molded bottles or in heat shrinkable labels, heat shrinkable sealing caps and other food packing materials.

The subject matter of this invention is a vinyl chloride based resin composition comprising the following (a), (b), and (c): (a) 100 weight parts of vinyl chloride based resin obtained by adding 0.005 to 0.5 weight part of partially saponified polyvinyl alcohol, degree of saponification 20–55 mol %, mean degree of polymerization 150–600, to 100 weight parts of loaded vinyl chloride monomer or a mixture of vinyl based monomer with vinyl chloride as main, during suspension-polymerizing in an aqueous medium under the existence of 0.03–0.08 weight parts of partially saponified polyvinyl alcohol, degree of saponification 65–80 mol %, mean degree of polymerization 600–1000, or else in slurry after completion of said suspension-polymering, (b) 0.3 to 5 weight parts of non-toxic stabilizer for food which is a liquid composite stabilizer selected from octyl tin mercaptide compounds, octyl tin maleate compounds, and calcium-soap/zinc-soap/auxiliaries; and (c) 4 to 15 weight parts of butadiene-styrene based copolymer resin.

DETAILED EXPLANATION OF THE INVENTION

The vinyl chloride based resin composition by this invention is obtained by adding, as a chief material, 0.005 to 0.5 weight parts of partially saponified polyvinyl alcohol, degree of saponification 20–55 mol %, mean degree of polymerization 150–600 to 100 weight parts of vinyl chloride monomer or a mixture of vinyl based monomer mainly composed of vinyl chloride in the presence of partially saponified polyvinyl alcohol (degree of saponification 65–80 mol %, mean degree of polymerization 600–1000), when suspension polymerized in an aqueous medium or else in slurry after completion of the polymerization.

If said addition volume is less than 0.005 weight part, the formed products cannot be free from being cloudy, but if it exceeds 0.5 weight part, scales may be adhered to the inner face of the polymerized material or the grain size thereof may become too large.

If, on the other hand, the degree of saponification of the partially saponified polyvinyl alcohol is less than 20 mol%, then the particles of formed polymer will be too large, while if the degree of saponification is more than 50 mol %, the effect of preventing the polymer from becoming opaque in hot water will be reduced, which is not desirable either. Further, the mean degree of polymerization of said partially saponified polyvinyl alcohol is less than 150, then the particles of formed polymer will be too coarse, but if the mean degree of polymerization is more than 600, an undesirable reduction of the clouding preventive effect will occur. More specifically, 200 to 500 of mean degree of polymerization is preferable.

The partially saponified polyvinyl alcohol may be added in the form of powder or this alcohol may be dissolved into liquid, and the time of the addition may be before, during, or after completion of polymerization into slurry.

The raw material of polymer as vinyl chloride resin composition by this invention includes vinyl chloride resin monomer and a mixture of vinyl based monomer with vinyl chloride as the main ingredient and copolymerizable with said vinyl chloride resin monomer (vinyl chloride content: 50 weight % or more). As representative examples of comonomers copolymerizable with said vinyl chlorides, but not by way of limitation, we may enumerate: such vinyl esters as vinyl acetate, vinyl propionate; such acrylates or methacrylates as methyl acrylate and ethyl acrylate; such olefins as ethylene and propylene; maleic anhydride; acrylonitrile; styrene;

vinylidene chloride; and other monomers which are copolymerizable with vinyl chlorides.

The suspension polymerization with said monomers is performed in an aqueous medium in the presence, as a suspension agent, of partially saponified polyvinyl alcohol whose degree of saponification is 65 to 80 mol % and mean degree of polymerization is 600 to 1,000.

The suspension agent should be added in 0.03 to 0.08 weight parts to loaded 100 weight parts of vinyl chloride monomer or a mixture of vinyl based monomers with vinyl chloride as the main constituent. If the degree of saponification is less than 65 mol %, the particles of formed polymer will be too coarse, and if the degree of saponification is greater than 80 mol %, the effect of preventing clouding in hot water will be diminished, which is not desirable.

One type or combined two or more types of other suspension agents ordinarily used in the polymerization of vinyl chlorides in aqueous media may be used. They are, but not limited to, such water soluble cellulose ethers as methyl cellulose, hydroxyethyl cellulose, hydroxypropylmethyl cellulose; acrylic acid polymer; such water soluble polymers as gelatin; such oil soluble emulsifiers as sorbitan monolaurate, sorbitan trioleate, glycerine tristearate, ethyleneoxide-propyleneoxide block copolymer; such water soluble emulsifiers as polyoxyethylenesorbitan monolaurate, polyoxyethylene glycerine oleate, sodium laurate.

Other conditions of said polymerization, such as loading methods of aqueous media to polymerizer, vinyl chloride monomers, other comonomers in some cases, suspension agents, polymerization initiators may be same as conventional ones. Loading proportions, polymerization temperature and the polymerization conditions thereof may also be the same as conventionally used.

Further the polymerization initiators used in the polymerization may be those which have been used conventionally for vinyl chloride based polymerization. One type or combined two or more types of the initiators can be used. Representative examples of these initiators are, but not limited to, such percarbonate compounds as diisopropyl peroxydicarbonate, di-2-ethylhexyl peroxydicarbonate, diethoxyethyl peroxydicarbonate; such perester compounds as t-butylperoxyneodecanate, t-butylperoxypivalate, t-hexylperoxypivalate,α-cumylperoxyneodecanate, such peroxides as acetylcyclohexylsulfonyl peroxide, 2,4,4-trimethylpentyl-2-peroxyphenoxyacetate, 3,5,5-trimethyl- hexanoylperoxide; such azo compounds as azobis-2,4-dimethyl-valeronitrile, azobis (4-methoxy-2,4-dimethylvaleronitrile); and potassium persulfate, ammonium persulfate, hydrogen peroxide.

Furthermore, as occasion arises, those agents for polymerization of vinyl chlorides such as polymerization regulators, chain transfer agents, pH adjustors, gelation improvers, antistatic agents and scale inhibitors may also be added.

Formed products of food containers and food packing materials that are transparent and hardly become opaque such as bottles may be obtained from vinyl chloride based resin compositions which can be produced by adding, to 100 weight parts of vinyl chloride based resins obtained as above, 0.3–5 weight parts of non-toxic stabilizer for food and 4 to 15 weight parts of butadiene-stylene based copolymer resin.

What may be exemplified as non-toxic stabilizers for food are, but not limited to, the following three types: octyl tin mercaptide based compounds, octyl tin maleate based compounds and composites of calcium-soap, zinc-soap, and auxiliaries (mainly epoxidized soybean oil, organic phosphorous acid compounds). They may be used either independently or in combinations of two or more types, but more preferably, use of octyl tin mercaptide based compounds is desirable from the viewpoint of acquiring transparency and effects of clouding prevention.

If the amounts of these non-toxic stabilizers for food are less than 0.3 weight parts, the effect of thermal stability loses, but if they surpass 5 weight parts, any further effect cannot be expected and the cost thereof will increase, which is not desirable from an economical point of view.

The above-mentioned butadiene-styrene based copolymer resins are added as impact strength modifiers. As examples thereof we may illustrate, but not by way of limitation, butadiene-styrene copolymers, methylmethacrylate-butadiene-styrene copolymers, acrylonitrile-butadiene-styrene copolymers, methylmethacrylate-acrylonitrile-butadiene-styrene copolymers. Out of these butadiene-styrene based copolymer resins, methylmethacrylate-butadiene-styrene copolymer resins are specifically preferable.

If the amounts of such resins are less than 4 weight parts, the effect of impact resistance will be poor, while if they exceed 15 weight parts, working will be difficult and the cost thereof will increase, which is not desirable from an economical viewpoint.

To the vinyl chloride based resin compositions thus obtained, can be added, as occasion arises and to the extent that the transparency of the formed products be maintained, such plasticizers as dioctyl phthalate; such stabilizing auxiliaries as epoxidized soybean oil; such processing aids as methyl methacrylate based resins, ultraviolet absorbers; such coloring agents as blooming agents; lubricants and other additives.

The foregoing vinyl chloride resin compositions may formed into transparent vinyl chloride based resins that hardly become cloudy. The transparency of these transparent products as measured with 0.5 mm thick pressed sheet under 170° C. or higher temperature is 5.0%, and more preferably 2.0% or less in haze value.

Forming may be extrusion, calendering, or blow molding, all using ordinary proportioning processes. The products thus formed are most suited to films for food, bottles for portable water, or else to heat shrinkable films for food which are produced by drawing extruded sheets and calendered sheets.

WORKING EXAMPLES

To further illustrate this invention by way of concrete modes, and not by way of limitation, the following working examples are given hereunder:

MANUFACTURING OF VINYL CHLORIDE RESINS

Example 1

Into a stainless steel autoclave 2000 l inner volume with an agitator and jacket, were poured 900 kg of deionized water. 300 g of partially saponified polyvinyl alcohol (mean degree of polymerization: 770, degree of saponification: 72.4 mol %), 60 g partially saponified polyvinyl alcohol (mean degree of polymerization: 300, degree of saponification: 48.2 mol %), and 180 g of azobis-2,4-dimethylvaleronitrile respectively. After deaerating this recipient down to 50 mmHg, another 600 kg of vinyl chloride monomer was added thereto. While stirring the contents of the autoclave, hot water was fed into the jacket to raise the temperature thereof up to 63.5° C. and polymerization was continued while maintaining that temperature. When the pressure in the polymerizer was reduced down to 8.0 kg/cm$^2$G, unreacted monomers were recovered. Slurry containing polymers were taken out of the recipient, and then dehydration dried. This process gave a vinyl chloride resin of mean degree of polymerization: 810.

Example 2

Instead of pouring, before starting polymerization, 60 g of partially saponified polyvinyl alcohol (mean degree of polymerization: 300, degree of saponification: 48.2 mol %) as in the Example 1 above, 120 g thereof was added into the slurry after completion of polymerization and then dehydration dried. Except this all the process steps were the same as in the Example 1, which gave a vinyl chloride resin.

Example 3

Instead of partially saponified polyvinyl alcohol (mean degree of polymerization: 300, degree of saponification: 48.2 mol %) as in the Example 1 above, partially saponified polyvinyl alcohol (mean degree of polymerization: 500, degree of saponification: 36.8 mol %) was used. Except this, all the process steps were the same as in the Example 1, which gave a vinyl chloride resin.

Example 4

A vinyl chloride resin was obtained in the same manner as in the Example 1 except that instead of using 300 g of partially saponified polyvinyl alcohol (mean degree of polymerization: 770, degree of saponification: 72.4 mol %), 360 g of partially saponified polyvinyl alcohol (mean degree of polymerization: 790, degree of saponification 73.0 mol %) and 3 g of hydroxypropylmethyl cellulose with 26% of methoxy substitute group and 10% of hydroxy- propoxy substitute group were used.

Comparative Example 1

A vinyl chloride resin was obtained in the same manner as in the Example 1 except that 270 g of partially saponified polyvinyl alcohol (mean degree of polymerization: 2640, degree of saponification: 81.0 mol %) was used instead of 300 g of partially saponified polyvinyl alcohol (mean degree of polymerization: 770, degree of saponification: 72.4mol %) and 60 g of partially saponified polyvinyl alcohol (mean degree of polymerization: 300, degree of saponification: 48.2 mol %).

Comparative Example 2

A vinyl chloride resin was obtained in a same manner as in the Example 1 except that 300 g of hydroxypropylmethyl cellulose with 20% of methoxy substitute group and 8% of hydroxypropoxy substitute group was used instead of 300 g of partially saponified polyvinyl alcohol (mean degree of polymerization: 770, degree of saponification: 72.4 mol %) and 60 g of partially saponified polyvinyl alcohol (mean degree of polymerization: 300, degree of saponification: 48.2 mol %).

WHITENING TEST OF FORMED PRODUCTS

Vinylchloride resin compositions were prepared from vinyl chloride resins obtained in the foregoing Examples 1 to 4 through and Comparative Examples 1 and 2, respectively by following proportioning examples of heat shrinkable films and of bottles.

Example of proportioning for heat shrinkable films:

| | |
|---|---|
| vinyl chloride resin | 100 weight parts |
| MBS resin | 8 weight parts |
| (B-22 of Kanegafuchi Chemical Industry Co., Ltd. made) | |
| DOP | 7 weight parts |
| octyl tin maleate polymer stabilizer | 3.5 weight parts |
| (TVS8813 of Nitto Kasei K.K. made) | |
| acryl based processing aid | 2 weight parts |
| (PA-20 of Kanegafuchi Chemical Industry Co., Ltd. made) | |
| stearyl alcohol | 0.8 weight part |
| butyl stearate | 0.8 weight part |
| Example of proportioning for bottles: | |
| vinyl chloride resin | 100 weight parts |
| MBS (B-22) | 7 weight parts |
| octyl tin mercaptide based stabilizer | 1.8 weight parts |
| (TVS8813) | |
| acryl based processing aid (PA-20) | 2 weight parts |
| monoglyceride stearate | 1.0 weight part |
| polyethylene wax | 0.2 weight part |

The respective vinyl chloride resin compositions formed by the above-mentioned proportioning examples were put into a 6-inch roll kneader and kneaded at 170° C. for 5 minutes to manufacture 0.8 mm thick sheets. These sheets were cut into determined lengths and pressed at 180° C. for 5 minutes. Then, transparent sample pieces thereof having 0.5 mm in thickness for measurement were obtained.

These sample pieces were immersed in hot water maintained at 80° C. and then removed. Their total transmittances and haze values were measured after 24 hours' incubation by means of a digital turbidimeter NDH-20D (Nippon Denshoku Kogyo K.K. made). The results of these measurements are shown in Table form as below:

TABLE

| | | Before maintain in hot water | | After maintain in hot water | |
|---|---|---|---|---|---|
| | | Haze value % | Total transmitt. % | Haze value % | Total transmitt. % |
| Proportion for heat shrinkable films | Example 1 | 1.6 | 91.3 | 14.2 | 81.3 |
| | Example 2 | 1.7 | 91.7 | 15.8 | 80.9 |
| | Example 3 | 1.4 | 91.1 | 15.7 | 80.7 |
| | Example 4 | 1.6 | 91.4 | 14.8 | 81.0 |
| | Comp. Ex. 1 | 1.5 | 91.2 | 40.5 | 76.0 |
| | Comp. Ex. 2 | 1.4 | 91.0 | 46.2 | 75.0 |
| Proportion for bottles | Example 1 | 1.2 | 91.2 | 12.1 | 83.1 |
| | Example 2 | 1.3 | 91.2 | 13.5 | 82.2 |
| | Example 3 | 1.1 | 91.3 | 13.4 | 82.4 |
| | Example 4 | 1.2 | 91.0 | 12.8 | 83.0 |
| | Comp. Ex. 1 | 1.3 | 91.1 | 37.5 | 76.2 |
| | Comp. Ex. 2 | 1.1 | 91.5 | 44.2 | 75.8 |

What is claimed is:

1. A vinyl chloride-based resin composition for food containers and food packaging materials comprising:
   (a) about 100 parts by weight of a vinyl chloride-based resin formed by adding
      to an aqueous medium having (1) about 0.03 to about 0.08 parts by weight of a partially saponified polyvinyl alcohol having a degree of saponification of about 65 to about 72.4 mol % and a mean degree of polymerization of about 600 to about 1,000 and (2) 100 parts by weight of loaded vinyl chloride monomer or 100 parts by weight of a mixture of vinyl-based monomer having vinyl chloride as a main constituent either during suspension polymerization and after suspension polymerization is completed about 0.005 to about 0.5 parts by weight of a partially saponified polyvinyl alcohol having a degree of saponification of about 20 to about 55 mol % and a mean degree of polymerization of about 150 to about 600;

(b) about 0.3 to about 5 parts by weight of a non-toxic liquid composite stabilizer for food; and (c) about 4 to about 15 parts by weight of a butadiene-styrene based copolymer resin.

2. The vinyl chloride based resin composition of claim 1, wherein said liquid composite stabilizer comprises at least one compound selected from the group consisting of octyl tin mercaptide compounds, octyl tin maleate compounds, calcium-soaps, zinc-soaps and auxiliaries.

3. The vinyl chloride based resin composition of claim 1, wherein said butadiene-styrene based copolymer is methylmethacrylate-butadiene-styrene copolymer.

4. The vinyl chloride based resin composition of claim 1, wherein a 0.5 mm thickness sheet formed of said vinyl chloride based resin composition at not less than 170° C. has a haze value of less than about 5.0%.

5. The vinyl chloride based resin composition of claim 1, wherein a 0.5 mm thickness sheet formed of said vinyl chloride based resin composition at not less than 170° C. has a haze value of less than about 2.0%.

6. The vinyl chloride-based resin composition of claim 1, wherein the partially saponified polyvinyl alcohol having a degree of saponification of about 20 to about 55 mol % has a mean degree of polymerization of about 200 to about 500.

* * * * *